3,335,782
METHOD FOR SECURING BURNERS

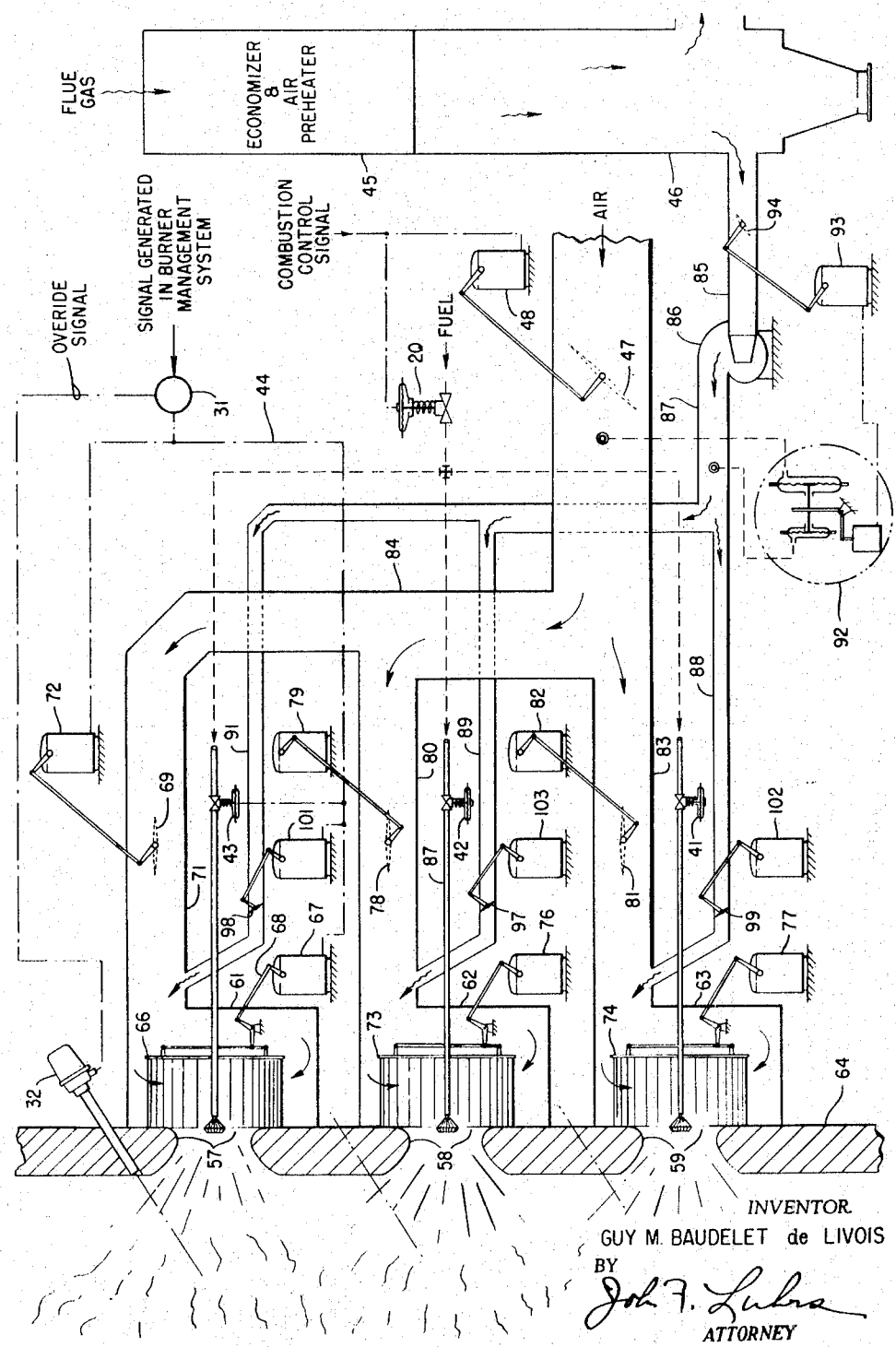

Guy M. Baudelet de Livois, Paris, France, assignor to Controle Bailey (Societe Anonyme), a company of France
Original application July 8, 1965, Ser. No. 470,413. Divided and this application Aug. 1, 1966, Ser. No. 594,289
Claims priority, application France, Aug. 5, 1964, 984,257
8 Claims. (Cl. 158—117.5)

ABSTRACT OF THE DISCLOSURE

A method for securing one or more of a plurality of burners supplying a common furnace, each burner having a fuel supply pipe and an air register, which comprises shutting off the flow of fuel to the burner, closing the associated air register and blanketing the inlet side of the air register with an inert gas which may be recirculated flue gas.

---

This is a division of application Ser. No. 470,413, filed July 8, 1965.

This invention relates to a method and apparatus for operating burners. More particularly the invention relates to a method and apparatus for securing one or more of the burners delivering fuel and air to a furnace.

One object of my invention is to provide an arrangement for safely and economically firing a furnace under partial load conditions with one or more of the burners supplying fuel and air thereto secured.

Another object of my invention is to provide a simple, economical arrangement for cooling the secured burners.

A further object of my invention is to provide an arrangement for maintaining the proper distribution of air for combustion in a furnace when one or more burners supplying fuel and air thereto are secured.

Still another object of my invention is to provide an arrangement whereby a furnace having a plurality of burners may be operated with one percent or less of free oxygen in the flue gas at partial load with one or more of the burners secured.

A further object of my invention is to provide an arrangement preventing the leakage of air through a secured burner into a furnace.

In accordance with my invention when a burner is secured, concurrently with the fuel and air thereto being shut off an inert gas such as recirculated flue gas is substituted for the normal air supply. Thus leakage, if any, through the burner merely introduces an inert gas into the furnace. The normal or desired excess air is then maintained at the operating burners and in the furnace which is not the case with presently available burners wherein a certain amount of air leakage necessarily occurs through any secured burners.

Until recently the increase in excess air caused by air leakage into a furnace through a secured burner or burners could be tolerated as it was and is customary under present practice to operate a furnace at a fairly high excess air in the order of 15% or more. Little or no effect is felt by slightly reducing the air-fuel ratio to the operating burners to compensate for the air leakage through the secured burners. Or in the alternative, by maintaining the same air-fuel ratio in the operating burners and permitting the furnace as a whole to operate at a slightly greater excess air. Recent studies have shown, however, that in addition to increasing efficiency, the formation of deleterious compounds in the flue gas is retarded by operation at approximately zero excess air, that is to say operation at an excess air of 5% or less. To accomplish this it is essential that the correct air-fuel ratio be maintained at all operating burners and air leakage through any burners which are secured be eliminated. It is to a method and apparatus for accomplishing these and other objects that my invention is directed.

Referring to the drawing, I show a furnace having a wall 64 in which are mounted a plurality, in the specific embodiment shown, three burners 57, 58 and 59 supplied with air through individual windboxes 61, 62 and 63 respectively. The air for combustion is supplied the burner 57 through a register 66 positioned to the open or closed position by any suitable device such as a control drive 67 through linkage 68. A shut-off damper 69 is mounted within a duct 71 through which air to the windbox 61 is supplied. The damper 69 is positioned to an open or closed position by a control drive 72. In a similar manner combustion air to the burners 58 and 59 is supplied through registers 73 and 74 which are positioned to the open or closed position by a control drive 76 and 77 respectively. A shut-off damper 78 positioned by a control drive 79 is provided in duct 80 through which air to the windbox 62 is supplied. Similarly, combustion air supplied the burner 59 may be shut off by a damper 81 mounted within a duct 83 and positioned by a control drive 82.

The air ducts 71, 80 and 83 are connected to a supply duct 84 which in turn is connected to one or more force draft fans, not shown, as conventional in the art. Disposed in the fuel supply lines to burners 57, 58 and 59 are shut-off valves 43, 42 and 41 respectively. Fuel and air to burners 57, 58 and 59 may be regulated by positioning a damper 47 by means of a control drive 48, and a fuel valve 20 from a control signal derived from a conventional combustion control system, as common in the art; or in the alternative, the dampers 69, 78 and 81 may be used as combination control and shut-off dampers. Similarly valves 43, 42 and 41 may be used both to control the flow of fuel and act as shut off valves. In the latter case dampers 69, 78 and 81 as well as the valves 43, 42 and 41 would be controlled from a signal derived from a conventional combustion control system and damper 47, control drive 48 and fuel valve 20 omitted.

During normal operation more or less equal fuel flows to the burners 57, 58 and 59 are maintained and variations in heat release obtained by adjusting in substantially equal amounts the fuel flows to all of the burners. Simultaneously with changes in fuel flow, corresponding changes in air flow are made by parallel adjustment of the individual dampers 69, 78 and 81 or in the alternative by adjustment of the force draft damper 47. With the latter form of control, as previously explained, the individual dampers 69, 78 and 81 are held in a wide open position. As with burners presently available, whether for firing oil, gas or coal, the required range in heat release cannot be obtained, it is customary practice to operate with all burners in service from max. heat release to some predetermined lesser heat release when one or more burners are secured to permit a further reduction in heat release.

At such time the fuel flow to the burner or burners being secured is shut-off and the associated air registers closed. Certain auxiliary operations may also be required such as withdrawing the burner tip, in case of oil firing, to prevent overheating, carbonizing of the fuel remaining in the burner, etc.

As heretofore explained air registers such as shown at 66, 73 and 74 are not tight closing and accordingly air, while the burner is secured, passes through the burner and escapes into the furnace. Such air does not ordinarily enter into the combustion process as it is not properly mixed with the fuel discharged from the burners remaining in service. Also as it is customary to ratio total fuel to total air, the air actually available for combustion at the burners in operation may decrease. To avoid the consequence of operating with a deficiency of air and to provide a factor of safety, ordinarily the total air to total fuel ratio is maintained higher than would otherwise be required. Recent tests have indicated that a high air-fuel ratio in addition to decreasing efficiency also results in the formation of harmful substances in the products of combustion which rapidly deteriorate any surfaces with which they are in contact and polute the atmosphere upon being wasted.

In accordance with my invention the leakage of air through a secured burner is eliminated by sealing the inlet side of the closed air register with an inert gas. In some cases the inert gas may be the products of combustion discharged from the furnace which are composed largely of nitrogen and carbon dioxide. If the furnace is used to supply heat to a boiler or other heat absorbing apparatus, preferably the products of combustion (flue gas) are diverted to the air register after having passed through such apparatus as the gases are then sufficiently cooled to avoid the necessity for auxiliary cooling, which might otherwise be required. Thus referring to the drawing I show the inert gas as being drawn from a gas pass 46 of a boiler (not shown) just before the flue gases are wasted to the atmosphere. At such a point the temperature of the gases may be in the order of 350 degrees F. or less and relatively free of solids particularly if the gases have passed through a dust precipitator as is now common in the art. While I have shown the gas pass 46 as forming the outlet of an economizer and air preheater 45, it is evident that the inert gas may be obtained at any desired point in the gas stream as, for example, after a dust precipitator.

The diverted gas is passed through a duct 85 to a blower 86 which discharges into three branch ducts 88, 89 and 91 by way of a duct 87. Branch duct 91 discharges into the air supply duct 71 between damper 69 and register 66. Similarly, branch duct 89 discharges into duct 80 between damper 78 and register 73. Branch duct 88 discharges into duct 83 between damper 81 and register 74. The diverted gas is pressurized by the blower 86 and maintained positive with respect to the forced draft air by a differential pressure controller such as shown at 92 operating a damper 94 through a control drive 93. Disposed in ducts 88, 89 and 91 are shut-off dampers 99, 97 and 98 respectively, which are arranged to be operated by control drives 102, 103 and 101 respectively.

When burners 57, 58 and 59 are in operation, dampers 97, 98 and 99 are closed thus shutting off the flow of inert gas to the burner registers. When however a burner is secured as, for example, the burner 57, damper 98 is opened simultaneously with the closing of air register 66 and damper 69. Thus the flow of combustion air is shut off and the register 66 sealed with the inert gas. Similarly, when burner 58 is secured air register 73 and damper 78 are closed and damper 97 is opened and when burner 59 is secured air register 74 and damper 81 are closed and damper 99 is opened.

I show dampers 97, 98 and 99 arranged to be operated by control drives 103, 101 and 102 respectively. As evident to those skilled in the art, the teachings of my invention may advantageously be incorporated in an Automatic Burner Management System so that the operations I have described in securing a burner may be performed automatically. Thus I show much an arrangement schematically for burner 57 wherein a control signal, transmitted through a line 44, from a signal generator such as shown at 31 is arranged to operate fuel shut-off valve 43, register 66, damper 69 and damper 98. Such a control signal may be originated by an operator or automatically. Further, I show schematically a system whereby an overriding signal for securing a burner may be generated by a flame failure detector, such as shown at 32, so that upon loss of ignition to the burner 57 the fuel flow thereto is shut off and concurrently register 66 and damper 69 are closed and damper 93 opened, thereby impressing on the inlet side of register 66 the inert gas, which being above the pressure of the forced draft, effectively seals the leakage of air through the register and into the furnace. Burners 58 and 59 may be similarly provided. I have not shown circuit details nor components as their inclusion is presumed and forms no part of my invention. Thus it is obvious that a lock out device in the circuit from the flame failure detector would be provided to allow igniting of the burner, etc.

As is evident from the preceding description, leakage of air into the furnace through a secured burner is completely eliminated by the introduction at the proper point into the air supply system of an inert gas such as pressurized recirculated flue gas. All secured burners are prevented from overheating by such leakage of the pressurized inert gas as may pass through the closed register. In certain instances it may be desirable to provide for a predetermined amount of leakage of the inert gas through the register to provide for such cooling. Obviously many such changes can be made both in equipment and arrangement without departing from the scope of my invention as set forth in the accompanying claims.

What I claim as new and desire to secure by Letters Patent of the United States is:

1. The method of securing one of a plurality of burners each discharging into a common furnace and each having separate fuel and air supply means, which includes, shutting off the flow of fuel and air to said one burner and thereafter recirculating gaseous products of combustion from the furnace through said one burner into the furnace.

2. The method of operating a furnace having a plurality of burners to each of which fuel and air is supplied to obtain a heat release less than the heat release obtainable with all of the burners in operation, which includes, shutting off the fuel and air to one or more of the burners and supplying recirculated flue gas in lieu of air to each of the burners to which the fuel and air supply is shut off.

3. The method of securing a burner having a fuel supply pipe and an air register for admitting air to the burner, which includes, shutting off the fuel to the burner, closing the air register and thereafter blanketing the inlet side of the closed register with an inert gas.

4. The method of operating a furnace having a plurality of burners each having a fuel supply pipe and an air register for admitting air to the burner to obtain a heat release less than the heat release obtainable with all of the burners in operation, which includes, shutting off the fuel flow through the fuel supply pipe to one of the burners, closing the air register of that burner and blanketing the inlet side of the air register with an inert gas.

5. The method of claim 4 including the further step of obtaining the inert gas by recirculating flue gas from the furnace to the inlet side of the air register.

6. The method of operating a furnace having a burner to which fuel is supplied through a pipe and air is supplied through a register upon flame failure, which includes, shutting off the flow of fuel through the supply pipe, closing the air register and blanketing the inlet side of the register with an inert gas.

7. The method of securing a burner to which fuel is supplied through a pipe and air is supplied through a register from a duct having a shut-off damper, which includes, shutting off the flow of fuel through the fuel supply pipe, closing the air register and the shut-off damper and introducing an inert gas into the air supply duct between the register and the shut-off damper.

8. The method of claim 7, which includes the further step of compressing the inert gas to a pressure above that of the air supply.

References Cited

UNITED STATES PATENTS 3,001,779   9/1961   Williams _____ 158—1
3,192,985   7/1965   Livingston et al. _____ 158—1

FREDERICK L. MATTESON, JR., *Primary Examiner.*

E. G. FAVORS, *Assistant Examiner.*